(12) United States Patent
Teraya

(10) Patent No.: US 8,527,983 B2
(45) Date of Patent: Sep. 3, 2013

(54) HOST BUS ADAPTOR DRIVER AND OPERATING SYSTEM INSTALLATION METHOD

(75) Inventor: Takuji Teraya, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 1057 days.

(21) Appl. No.: 12/057,421

(22) Filed: Mar. 28, 2008

(65) Prior Publication Data

US 2008/0244561 A1 Oct. 2, 2008

(30) Foreign Application Priority Data

Mar. 30, 2007 (JP) .................................. 2007-090211

(51) Int. Cl.
*G06F 9/445* (2006.01)

(52) U.S. Cl.
USPC .................................. 717/174; 714/5; 714/6

(58) Field of Classification Search
USPC ....................... 717/174; 714/4, 5, 6; 709/229
See application file for complete search history.

(56) References Cited

U.S. PATENT DOCUMENTS

| 7,228,538 | B1 * | 6/2007 | Burton et al. .................. 717/170 |
| 8,185,960 | B1 * | 5/2012 | Klein ............................... 726/27 |
| 2002/0103913 | A1 * | 8/2002 | Tawil et al. .................... 709/229 |
| 2003/0145078 | A1 * | 7/2003 | Hubbard ....................... 709/224 |
| 2005/0193228 | A1 * | 9/2005 | Miki ............................. 714/4 |
| 2007/0061803 | A1 * | 3/2007 | Barrett .......................... 717/178 |

FOREIGN PATENT DOCUMENTS

| JP | 2005-251188 | 9/2005 |
| JP | 2007-148714 | 6/2007 |

* cited by examiner

*Primary Examiner* — Chat Do
*Assistant Examiner* — Lynda Dinh
(74) *Attorney, Agent, or Firm* — Antonelli, Terry, Stout & Kraus, LLP.

(57) ABSTRACT

A host bus adaptor driver for installing an operating system in an I/O device unit from a system device. The connection of a single path and a single disk unit to the destination of installation is guaranteed at the time of installing an operating system in the I/O device unit having at least a redundant path or a plurality of disk units. Thus, the user is not required to change the system configuration definition and do the cable insertion/removal job. The host bus adaptor driver includes a device for reading the OS start information held in the host bus adaptors, a device for determining a host bus adaptor and a connection path for installing the operating system based on the OS start information thus read, and a device for permitting the installer of the operating system to use only the host bus adaptor and the connection path thus determined.

4 Claims, 5 Drawing Sheets

HOST BUS ADAPTOR DRIVER AND OPERATING SYSTEM INSTALLATION METHOD

BACKGROUND OF THE INVENTION

This invention relates to a driver for host bus adaptors connected to both a PCI bus and an I/O device unit of a computer system.

The I/O device unit such as the disk array device sold on the market in recent years realizes a high speed, a large capacity and a high reliability by combining a plurality of unit I/O devices.

In addition, in order to secure the redundancy between the system device and the I/O device unit, a plurality of host bus adaptors are mounted on the system device and connected with the I/O device unit through a plurality of paths, thereby securing a high reliability and a high speed of the interface as well as the redundancy.

The system configuration described above is very useful in that the system operation can be continued without suspension even in the case where the hardware develops a fault during the normal system operation.

At the time of installing an operating system (OS) in the system that has secured the redundancy, however, the user is required to cancel the redundant path connection and connect a single path and a single disk unit before carrying out the installation job. This is by reason of the fact that the installer for installing the operating system is not adapted for the system configuration having the redundant path connection, and therefore, at the time of installing the operating system, the order of disk recognition may be changed due to a fault, with the possible result that the data may be overwritten erroneously on other than a target disk unit.

In order to avoid this problem, the user is required to guarantee the connection of the single path and the single disk unit between the system device unit and the I/O device unit by changing the system configuration definition and inserting/removing the cable, before carrying out the job of installing the operating system.

The change of the system configuration definition and the cable insertion/removal requires the recheck of the connection path state after installation of the operating system, resulting in the consumption of a great amount of time.

JP-A-2005-251188 is available as a laid-open document related to this invention.

SUMMARY OF THE INVENTION

The object of this invention is to provide a host bus adaptor driver and an operating system installation method which guarantee the connection of a single path and a single disk unit to the destination of installation at the time of installing the operating system in an I/O device unit having a redundant path or a plurality of disk units, and eliminate the need of the change of the system configuration definition and the cable insertion/removal job by the user.

According to this invention, there is provided a host bus adaptor driver for a computer system having an installer for installing an operating system in an I/O device unit having a plurality of disk units, wherein a system device and the I/O device unit are connected to each other through a plurality of host bus adaptors included in the system device unit, and wherein each host bus adaptor includes the OS start information for registering the connection information to start the operating system, the host bus adaptor driver comprising a means for reading the OS start information held by each host bus adaptor, a means for determining the host bus adaptor and the connection path for installing the operating system based on the OS start information thus read, and a means for permitting the installer to use only the host bus adaptor and the connection path thus determined.

According to this invention, the operating system installation job can be carried out while guaranteeing the destination of installation of the operating system without the need of the job of changing the system configuration definition and the physical cable insertion/removal.

DESCRIPTION OF THE EMBODIMENTS

Next, this invention is explained with reference to the drawings.

Figure 1:
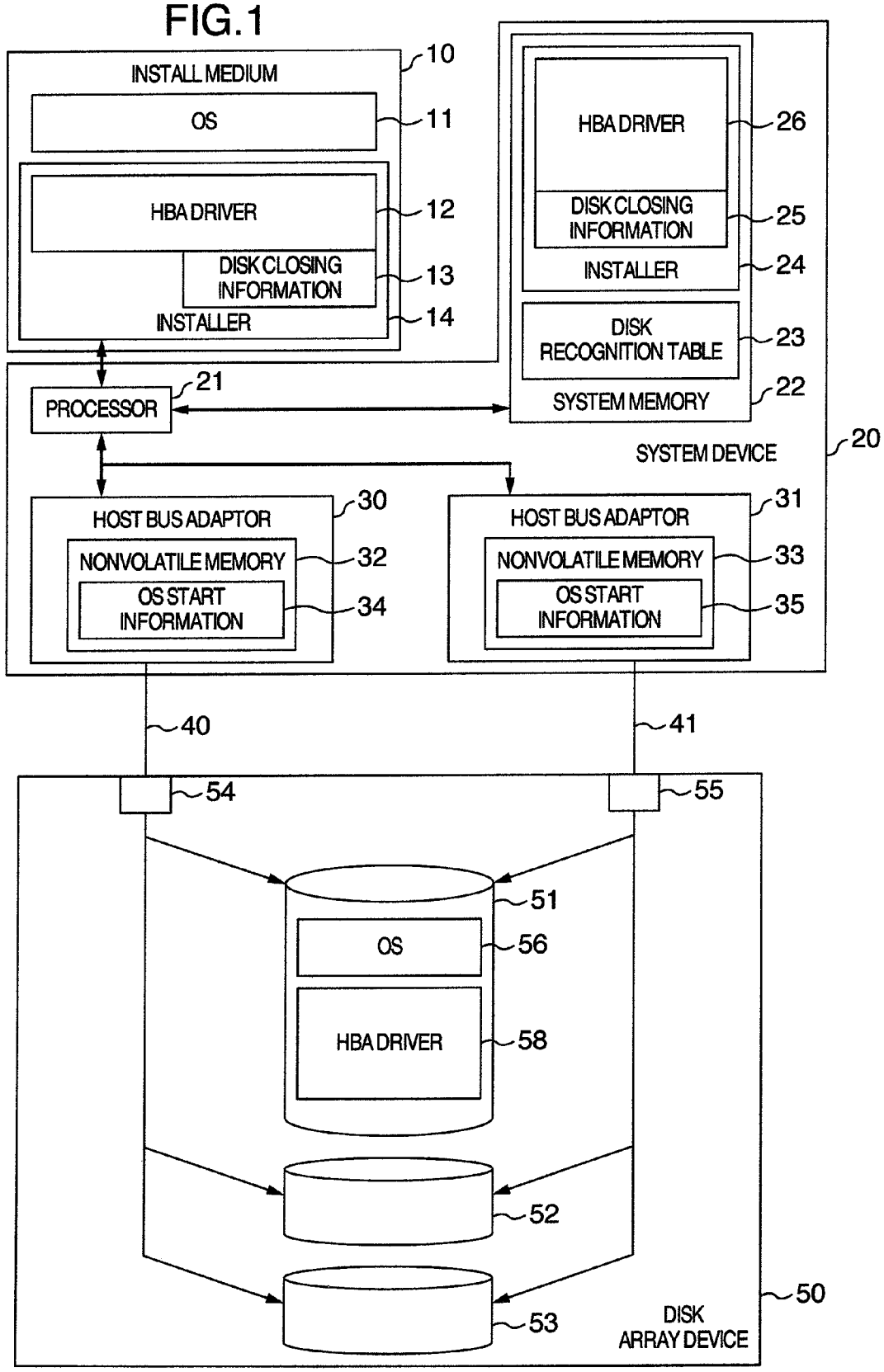
FIG. 1 is a diagram showing a block configuration of the whole system according to this invention.

FIG. 1 is a diagram showing the block configuration of the whole system including the host bus adaptor drivers (HBA driver) embodying the invention. A display array device is shown as an example of the I/O device unit connected.

An install medium 10 is configured of an installer 14 including a HBA driver 12, an operating system 11 and the disk closing information 13, wherein the data is transferred to the system device 20 through an external medium such as a CD-ROM or a network.

The system device 20 is configured of a processor 21, a system memory 22 and a plurality of host bus adaptors (HBA) 30 to 31.

The disk array device 50 is configured of a plurality of disk units 51 to 53, which are connected by one or both of the connection ports 54, 55. Each connection port has a unique world wide name.

The system device 20 and the disk array device 50 are connected to the connection ports 54, 55 using connection cables 40, 41 from the host bus adaptors 30, 31.

The processor 21 can access the disk units 51 to 53 through the host bus adaptors 30, 31, the connection cables 40, 41 and the connection ports 54, 55.

The connection cables 40, 41 are constituted of fiber channel cables or Ethernet (registered trademark) cable.

The host bus adaptors 30, 31 include nonvolatile memories 32, 33 therein having OS start information 34, 35, respectively, for designating a connection path indicating a particular connection port and a particular disk unit from which the operating system is started.

In a system having a redundant configuration, a plurality of connection paths are set for the OS start information 34, 35 so that the OS can be started from another connection path in the case where a fault develops in one connection path.

The disk recognition table 23 in the system memory 22 has registered therein only one connection path information indicating which host bus adaptor, which connection port and which disk unit are used to install the operating system in the disk unit.

Figure 2:
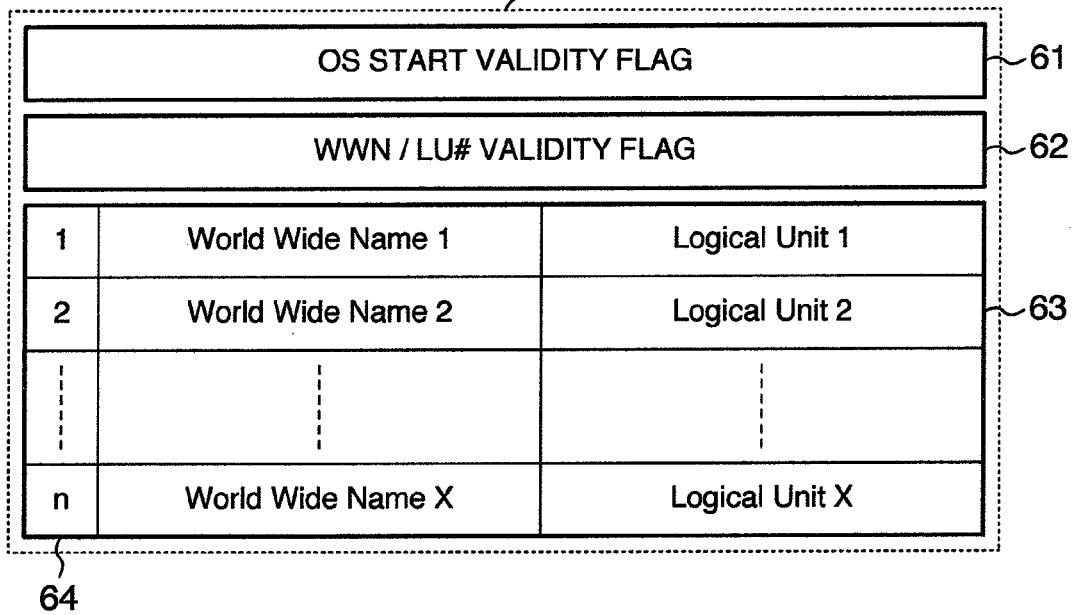
FIG. 2 is a diagram showing the OS start information in a host bus adaptor.

FIG. 2 shows the structure of the OS start information 34, 35 in the nonvolatile memories 32, 33.

The OS start information 34, 35 is configured of a world wide name/logical unit number (hereinafter referred to as the WWN/LU#) storage table 63 for storing the world wide name of the connection port and the logical unit number of the disk unit, a table entry number 64 indicating the storage number in the WWN/LU# storage table 63, a WWN/LU# validity flag 62 for controlling the validation/invalidation of the WWN/LU# storage table 63, and an OS start validity flag 61 for indicating that the operating system is started from a particular host adaptor.

Figure 3:
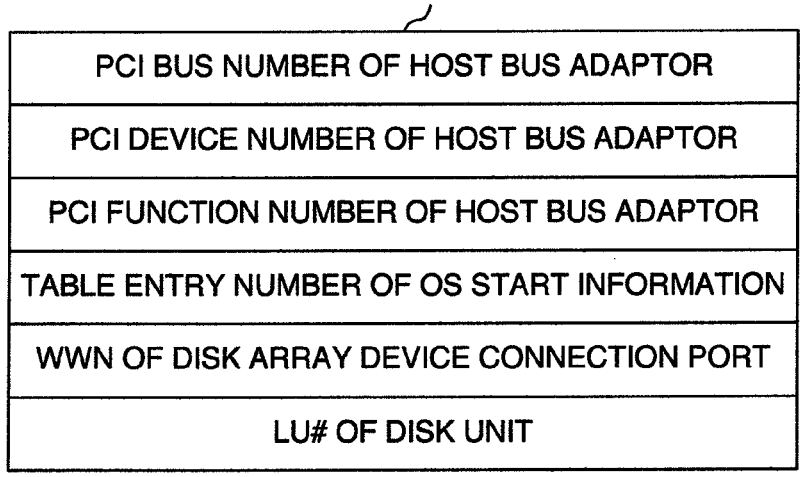
FIG. 3 is a diagram showing a disk recognition table in a system memory.

FIG. 3 shows the structure of the disk recognition table 23 in the system memory 22.

The disk recognition table 23 has the areas for storing the PCI bus numbers, the device numbers, the function numbers (PCI number) of the host adaptors 30, 31, the table entry numbers 64 for the OS start information 34, 35, the world wide names of the connection ports 54, 55 of the disk array device 50 and the logical numbers of the disk units.

Figure 4:
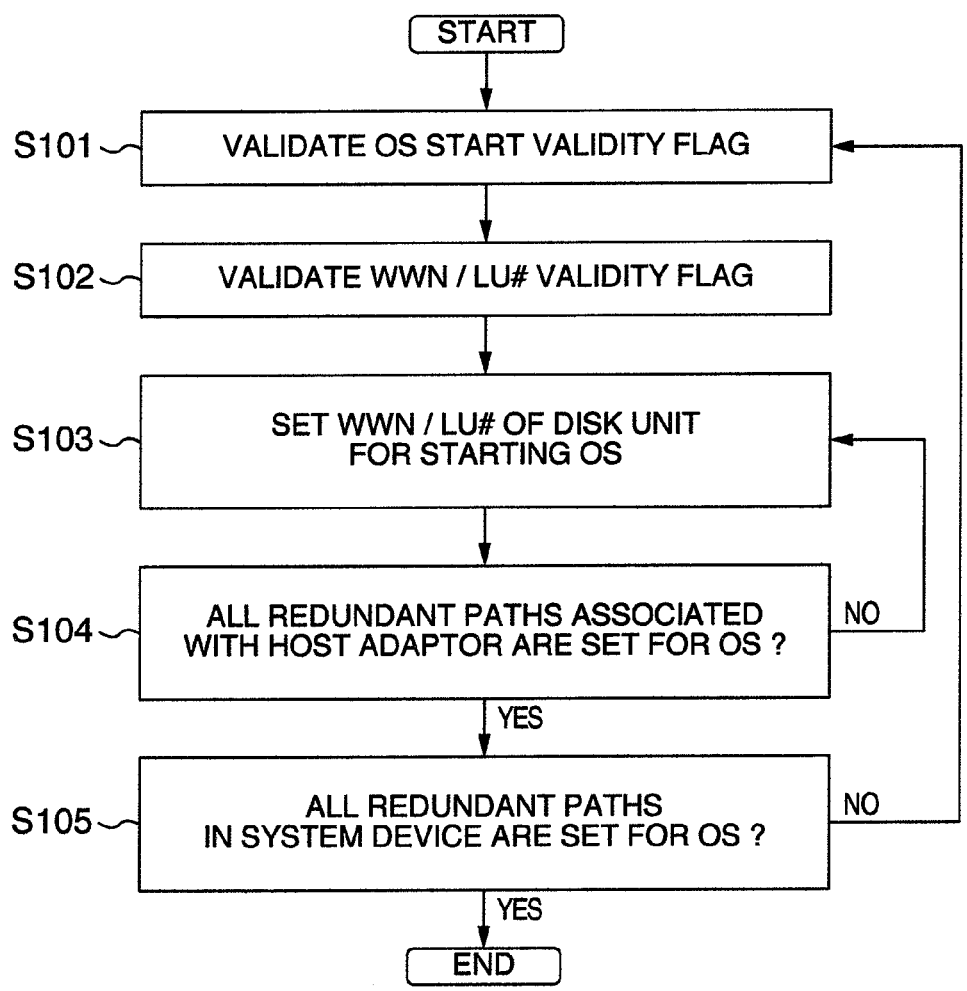
FIG. 4 shows the processing flow of the OS start information setting process.

FIG. 4 shows the processing flow for the preliminary setting job to execute the process of the HBA driver according to the invention.

This processing flow is for setting the OS start information to start the installed operating system 56 in the case where the operating system 11 stored in the install medium 10 is installed in the disk unit 51 in the disk array device 50.

Before installation/duplication of the operating system, the user sets in valid state the OS start validity flag 61 of the OS start information 34 stored in the nonvolatile memory 32 of the host bus adaptor 30 on the route of connection to the disk unit 51 (S101).

Also, the user sets the WWN/LU# validity flag 62 of the OS start information 34 in valid state (S102).

Further, the user set the world wide name of the connection port 54 and the logical unit number of the disk unit 51 in the WWN/LU# storage table 63 of the OS start information 34 (S103).

Furthermore, the user repeats the setting process (S103) until all the redundant connection paths for starting the operating system 56 from the host bus adaptor 30 are set in the WWN/LU# storage table 63 (S104).

In the case where a plurality of the connection paths connected to the host bus adaptor 30 are additionally registered, the world wide names of other connection ports and the logical unit numbers of the disk units are registered in the WWN/LU# storage table 63 (S103 to S104).

After complete setting of the connection paths associated with one host bus adaptor, the user repeats the steps S101 to S104 in the case where the setting of the redundant connection paths from another host bus adaptor to the disk unit 51 is required (S105).

For example, the disk unit 51 is accessible using the host bus adaptor 31, the connection path 41 and the connection port 55, so that the OS start validity flag 61 is set in steps S101 to S104 in that order for the OS start information 35 stored in the nonvolatile memory 33 of the host bus adaptor 31.

Figure 5:
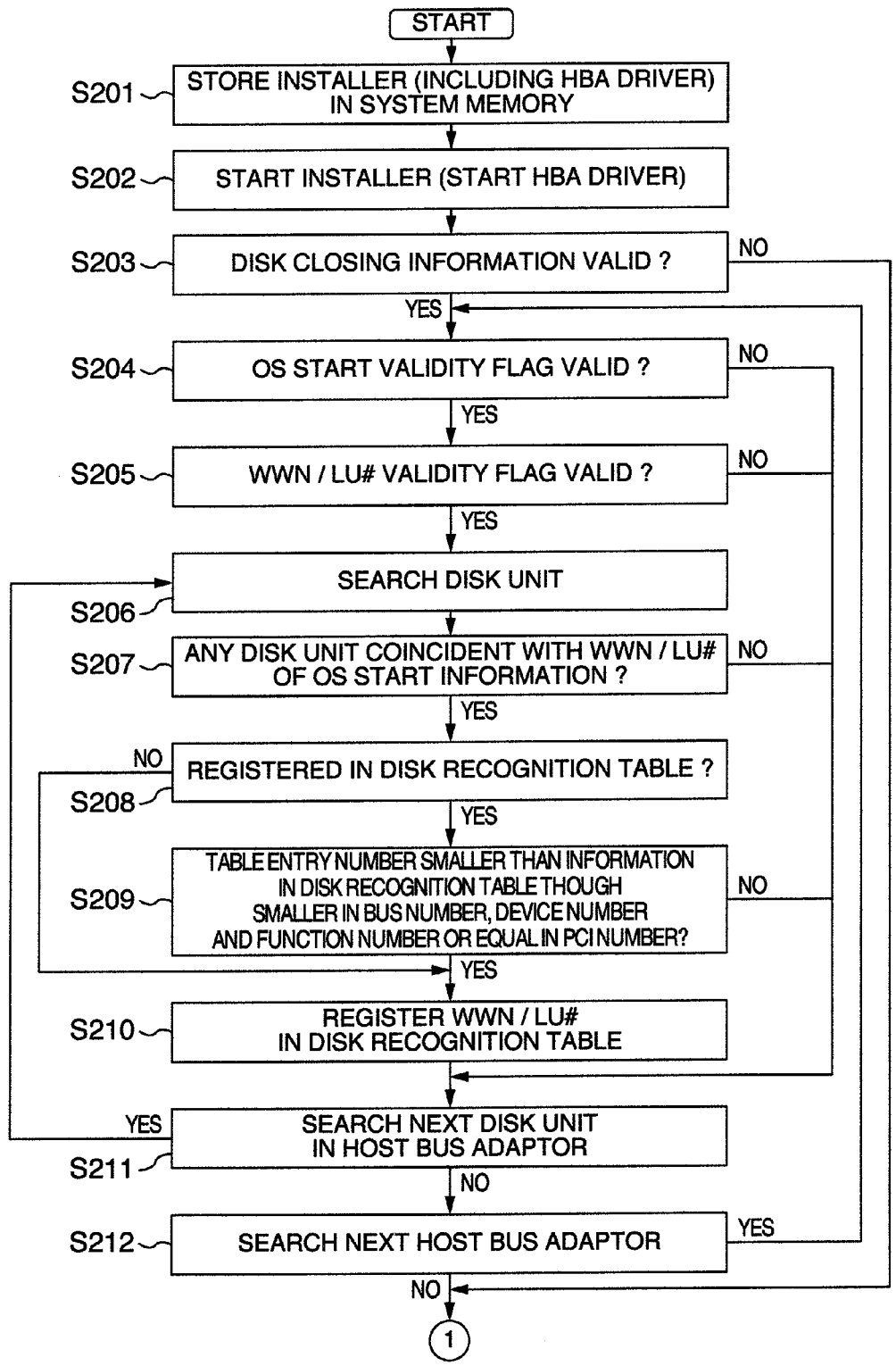
FIG. 5 shows the flow of the process for the system as a whole.
Figure 6:
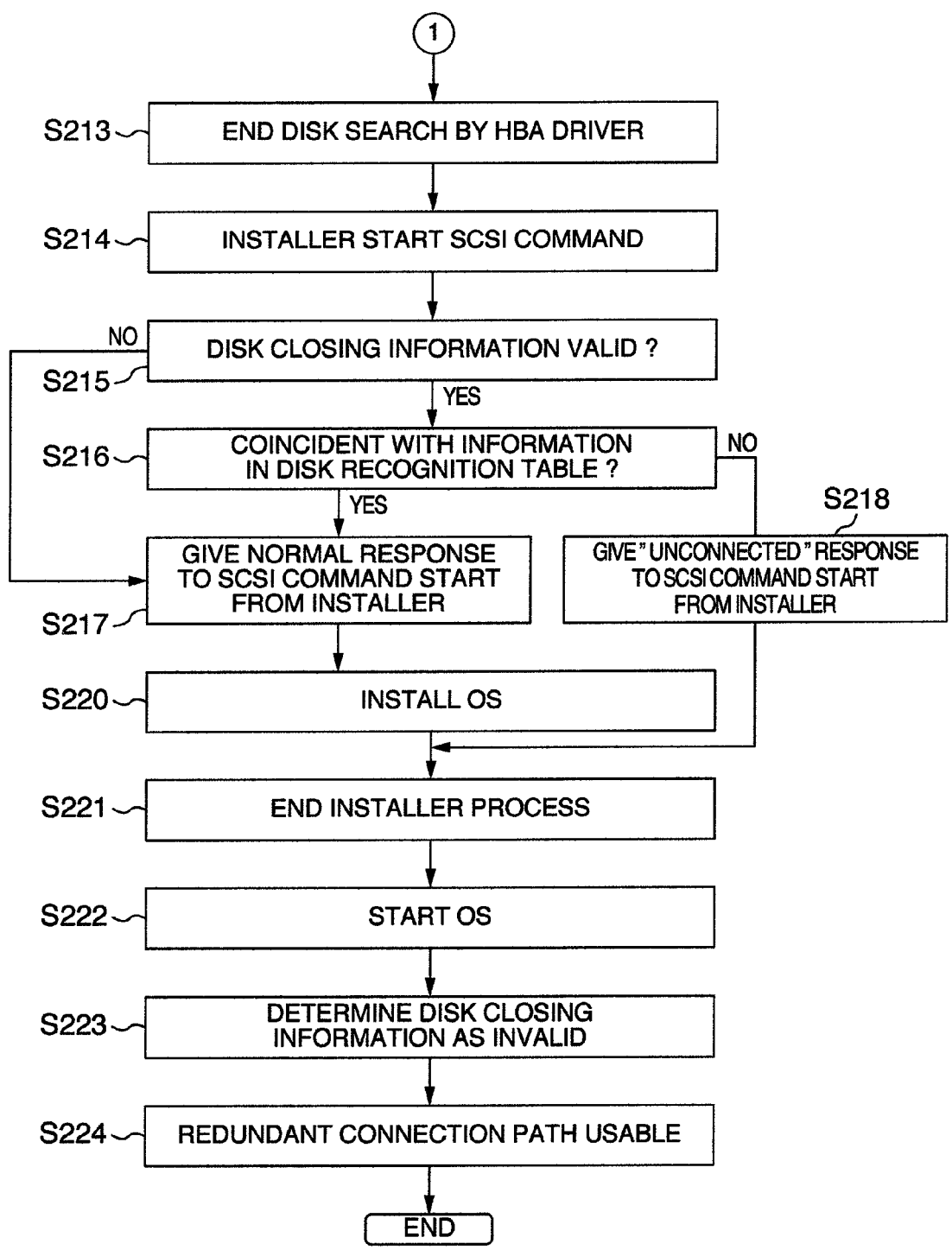
FIG. 6 shows the flow of the process for the system as a whole (continued from FIG. 6).

FIGS. 5 and 6 are diagrams showing the processing flow of the whole system including the process of the HBA driver according to this invention.

The installer 14 is started at the request of the user, transferred through an external medium such as CD/DVD and the network connection, and processed in the processor 21. The installer 14 and the HBA driver 12 and the disk closing information included in the installer 14 are stored in the system memory 22 in the system device 20 (S201).

The installer 14 of the install medium 10 stored in the system memory 22 is designated as an installer 24, the HBA driver 12 stored in the system memory 22 as a HBA driver 26, and the disk closing information 13 stored in the system memory 22 as disk closing information 25.

The installer 24 stored in the system memory 22 is started, and in order to issue a SCSI (small computer system interface) command to the disk array device 50, starts the HBA driver 26 (S202).

The installer 24 stored in the system memory 22 accesses the disk array device 50 connected to the host bus adaptors 30, 31 using the HBA driver 26.

The disk closing information 25 is defined in valid state by the installer 24, and the HBA driver 26 checks to see whether the disk closing information 25 is valid or invalid during the initialization of the driver (S203).

In the case where the disk closing information indicates the invalid state, all the disk units connected to the host bus adaptors 30, 31 are made accessible from the installer 24 by the HBA driver 26.

In the case where the disk closing information 25 indicates the valid state, on the other hand, the HBA adaptor 25 searches the disk units associated with all the host adaptors in the system device 20 in order to determine a single connection port and a single disk unit for installing the operating system.

A case is shown below in which the HBA driver 26 has searched the disk units associated with the host bus adaptors 30, 31 in that order.

The HBA driver 26 reads the OS start information 34 stored in the nonvolatile memory 32 of the host bus adaptor 30 and determines whether the OS start validity flag 61 indicates the valid state or not (S204).

In the case where the OS start validity flag 61 is valid, the HBA driver 26 determines whether the WWN/LU# validity flag 62 indicates the valid state or not (S205).

In the case where the WWN/LU# validity flag 62 is valid, the HBA driver 26 accesses the disk unit connected to the connection port 54 using the connection table 40 connected to the host bus adaptor 30 (S206).

The HBA driver 26 checks to see whether the connection path information registered in the WWN/LU# storage table 63 of the OS start information 34 contains any disk unit coinciding with the world wide name of the connection port 54 and the logical unit number of the disk unit at the time of access to the particular disk unit (S207).

In the case where a coincident disk unit is so contained, the HBA driver 26 checks to see whether any connection path information is registered in the disk recognition table 23 in the system memory 22 (S208).

In the case where no connection path information is registered in the disk recognition table 23, the HBA driver 26 stores, in the disk recognition table 23, the PCI bus number, the device number and the function number of the host bus adaptor 30, the world wide name of the connection port 54, the logical unit number of the disk unit, and further, the table entry number 64 in the WWN/LU# storage table of the OS start information 34 having a coincident WWN/LU# (S210).

In the case where any connection path information is registered in the disk recognition table 23, the HBA driver 26 checks to see whether the PCI bus number, the device number and the function number (PCI number) of the host bus adaptor 23 are smaller than the PCI bus number, the device number and the function number, respectively, of the connection path information stored in the disk recognition table 23 (S209), and in the case where they are so small, the HBA driver 26 writes all the information shown in FIG. 3 in the disk recognition table 23 (S210).

In the case where the PCI number of the host bus adaptor 30 is coincident with the PCI bus number, the device number and the function number stored in the disk recognition table 23, on the other hand, the HBA driver 26 checks to see whether the table entry number 64 having a coincident WWN/LU# of the OS start information of the host bus adaptor 30 is smaller than the table entry number of the OS start information stored in the disk recognition table 23 (S209), and if smaller, writes all the information shown in FIG. 3 in the disk recognition table 23 (S210).

This process (S206 to S210) is executed for all the disk units accessible from the host bus adaptor 30, while repeating the check with the OS start information (S211).

Further, the HBA driver 26, after completely searching all the disk units associated with the host bus adaptor 30, searches all the disk units associated with the host bus adaptor 31 (S212).

The HBA driver 26, by repeating these steps (S204 to S212), checks the OS start information for all the host bus adaptors mounted in the system device 20.

As a result, the connection path information, for which the disk unit 51 of the disk array device is accessible and which has the smallest table entry number 64 of the OS start information 60 in the host bus adaptor of the system device 20 having the smallest PCI number, device number and function number, is registered in the disk recognition table 23.

After complete disk search (S213), the HBA driver 26 receives the SCSI command start from the installer 24 (S214).

The HBA driver 26 checks to see whether the disk closing information 25 is defined by the installer 24 that has started the SCSI command (S215).

In the case where the disk closing information 25 indicates the invalid state, the HBA driver 26 gives the normal response to all the SCSI command starts from the installer (S217).

In the case where the disk closing information 25 indicates the valid state, on the other hand, the HBA driver 26 checks to see whether the host adaptor having a coincident PCI bus number, device number and function number stored in the disk recognition table 23 and the WWN/LU# of the connection port of the disk array device connected to the particular adaptor are coincident or not (S216).

The HBA driver 26 gives a normal response to the SCSI command start for the connection path coincident with the connection path information registered in the disk recognition table 23 (S217).

The HBA driver 26 gives a disk-unconnected response to the installer 22 with regard to the SCSI command start for the disk unit not coincident with the connection path information registered in the disk recognition table 23 (S218).

As the result of this process, only one connection port and only one disk unit that can be accessed and updated by the installer 24 are determined, so that the operating system can be installed for a single path and a single disk unit (S220).

After complete installation of the operating system in the disk unit, the process of the installer 24 is terminated (S221).

In the process described above, the operating system 11 stored in the install medium and installed in the disk unit is designated as an operating system 56, and the HBA driver installed in the disk unit as a HBA driver 58.

The operating system 56 installed in the disk unit may include a HBA driver.

After complete installation, the operating system 56 in the disk unit is started from the system device 20 (S222).

Nevertheless, the disk closing information is not contained in the operating system 56, and the HBA driver 58 judges that the disk closing information is invalid (S223). The processing flow, therefore, is similar to the one for the processing flow shown in FIGS. 5 and 6 in which the disk closing information is invalid (S203, S215). Thus, all the disk units accessible from the system device 20 can be used from the operating system (S224).

The HBA driver according to this invention may be installed in the host bus adaptor for controlling any protocol. For example, the I/O device unit may be connected by means of a fiber channel or Ethernet (registered trademark) cable.

By using the HBA driver for installation and duplication of the operating system, the operating system installation job can be performed without the system configuration definition or the path unification by the physical cable insertion/removal on the part of the user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An operating system (OS) installation method for a computer system including a system device having a plurality of host bus adaptors and an input/output (I/O) device unit having a plurality of disk units, the system device and the I/O device unit being connected to each other through the host bus adaptors by redundant connection paths, the OS installation method comprising:
the host bus adaptor driver:
reading the OS start information included in each of the host bus adaptors,
determining only one host bus adaptor and only one connection path for installing the operating system based on the OS start information that has been read, by determining that the host bus adaptor with the flag indicating a valid state is the one host bus adaptor for receiving installation of the operating system, wherein in a case where flags of a plurality of the host bus adaptors indicate the valid state, determining the one host bus adaptor for use in installation of the operating system, based on a value of a peripheral component interconnect (PCI) number of each host bus adaptor, by determining that the host bus adaptor having a smallest value of the PCI number is the select one host bus adaptor for use in installation of the operating system, and
making the installer use the determined host bus adaptor and the connection path and to not use any other host bus adaptor of the plurality of the host bus adaptors and any other connection path of the redundant connection paths,
wherein the computer system includes: an installer for installing the operating system in one disk unit of the I/O device unit, and a host bus adaptor driver for controlling the plurality of the host bus adaptors,
wherein each host bus adaptor includes nonvolatile memories having OS start information to register connection information for starting the operating system, and
wherein the OS start information includes a flag for controlling whether the host bus adaptor is to be used or not for starting the operating system.

2. An operating system (OS) installation method for a computer system including a system device having a plurality of host bus adaptors and an input/output (I/O) device unit having a plurality of disk units, the system device and the I/O device unit being connected to each other through the host bus adaptors by redundant connection paths,
the OS installation method comprising:
the host bus adaptor driver:
reading the OS start information included in each of the host bus adaptors,
determining only one host bus adaptor and only one connection path for installing the operating system based on the OS start information that has been read, by determining, in a case where a plurality of connection paths are registered in a plurality of entries of the table, that a connection path having a smallest entry number is the connection path for use in installation of the operating system, and
making the installer use the determined host bus adaptor and the connection path and to not use any other host bus adaptor of the plurality of the host bus adaptors and any other connection path of the redundant connection paths,
wherein the computer system includes: an installer for installing the operating system in one disk unit of the I/O device unit, and a host bus adaptor driver for controlling the plurality of the host bus adaptors,
wherein each host bus adaptor includes nonvolatile memories having OS start information to register connection information for starting the operating system, and
wherein at least a connection path for starting OS is registered as a table in the OS start information.

3. A host bus adaptor driver for a computer system including an installer for installing an operating system (OS) in one disk unit of an input/output (I/O) device,
the host bus adaptor driver comprising:
a means for reading the OS start information included in each of the host bus adaptors,
a means for determining only one of host bus adaptors and only one of the connection paths for installing the operating system, based on the OS start information that has been read, and
a means for making the installer use the host bus adaptor and the connection path determined, and to not use any other host bus adaptor of the plurality of the host bus adaptors and any other connection path of the redundant connection paths,
wherein the OS start information includes a flag for controlling whether the host bus adaptor associated with the flag is to be used to start the operating system or not, the host bus adaptor driver further comprising a means for determining that the host bus adaptor with the flag thereof indicating a valid state, is for installing the operating system,
a means for determining that a select host bus adaptor of the plurality of host bus adaptors with flags thereof indicating the valid state, is a host bus adaptor for use in installation of the operating system, the determining being made according to a value of a PCI number of the host bus adaptor, and
a means for determining a host bus adaptor having a smallest value of the PCI number is the select host bus adaptor for use in installation of the operating system,
wherein a system device and the I/O device having a plurality of disk units are connected to each other through a plurality of host bus adaptors included in the system device by redundant connection paths, and
wherein each of the host bus adaptors includes a nonvolatile memory having OS start information for registering connection information to start the operating system.

4. The host bus adaptor driver according to claim 3,
wherein at least one connection path for starting the operating system is registered as a table in the OS start information; and
wherein in a case where a plurality of connection paths are registered in a plurality of entries of the table, the host bus adaptor driver determines that a connection path having a smallest entry number is the connection path for use in installation of the operating system.

* * * * *